United States Patent
Wagner et al.

(10) Patent No.: US 10,539,726 B2
(45) Date of Patent: Jan. 21, 2020

(54) SOLAR CONTROL COATING WITH ENHANCED SOLAR CONTROL PERFORMANCE

(71) Applicant: Vitro Flat Glass LLC, Cheswick, PA (US)

(72) Inventors: Andrew V. Wagner, Pittsburgh, PA (US); Patrick Fisher, Pittsburgh, PA (US); Paul A. Medwick, Wexford, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 120 days.

(21) Appl. No.: 15/251,025

(22) Filed: Aug. 30, 2016

(65) Prior Publication Data

US 2017/0059753 A1  Mar. 2, 2017

Related U.S. Application Data

(60) Provisional application No. 62/212,665, filed on Sep. 1, 2015, provisional application No. 62/311,440, filed on Mar. 22, 2016.

(51) Int. Cl.
*G02B 5/28* (2006.01)
*G02B 1/14* (2015.01)
*G02B 5/22* (2006.01)

(52) U.S. Cl.
CPC ............... *G02B 5/282* (2013.01); *G02B 1/14* (2015.01); *G02B 5/22* (2013.01)

(58) Field of Classification Search
CPC . G02B 5/20; G02B 5/208; G02B 5/28; G02B 5/281; G02B 5/282; G02B 5/283; G02B 5/284; G02B 5/285; G02B 5/288; G02B 1/10; G02B 1/105; G02B 1/14; C03C 17/34; C03C 17/36; C03C 17/3602; C03C 17/3639; C03C 17/3642; C03C 17/3644; C03C 17/3647; C03C 17/3649; C03C 17/3657; C03C 17/366; C03C 17/3681; C03C 17/3652
See application file for complete search history.

(56) References Cited

U.S. PATENT DOCUMENTS 3,901,997 A   8/1975  Groth
4,286,009 A *  8/1981  Griest .................... F24S 70/25
                                           428/212

(Continued)

FOREIGN PATENT DOCUMENTS

CO   6571862 A2   11/2012
JP   2009215168 A   9/2009
WO   2014164674 A2   10/2014

*Primary Examiner* — William R Alexander
*Assistant Examiner* — Ephrem Z Mebrahtu
(74) *Attorney, Agent, or Firm* — The Webb Law Firm

(57) ABSTRACT

A solar control coating (30) includes a first phase adjustment layer (40); a first metal functional layer (46); a second phase adjustment layer (50); a second metal functional layer (58); a third phase adjustment layer (62); a third metal functional layer (70); a fourth phase adjustment layer (86); and optionally, a protective layer (92). At least one of the metal functional layers (46, 58, 70) includes a metal functional multi-film layer including (i) at least one infrared reflective film and (ii) at least one absorptive film.

20 Claims, 3 Drawing Sheets

(56) References Cited

U.S. PATENT DOCUMENTS

| | | | |
|---|---|---|---|
| 6,042,934 A * | 3/2000 | Guiselin | B32B 17/10174 |
| | | | 428/213 |
| 7,910,229 B2 | 3/2011 | Medwick et al. | |
| 2004/0009356 A1 | 1/2004 | Medwick et al. | |
| 2006/0246300 A1 * | 11/2006 | Hevesi | C03C 17/36 |
| | | | 428/432 |
| 2011/0236715 A1 * | 9/2011 | Polcyn | C03C 17/36 |
| | | | 428/623 |
| 2011/0262726 A1 * | 10/2011 | Knoll | C03C 17/36 |
| | | | 428/213 |
| 2011/0268941 A1 | 11/2011 | Fischer et al. | |
| 2012/0052320 A1 * | 3/2012 | Van Nutt | B32B 17/1022 |
| | | | 428/623 |
| 2012/0219821 A1 | 8/2012 | Frank et al. | |
| 2013/0057951 A1 * | 3/2013 | Hevesi | C03C 17/36 |
| | | | 359/359 |
| 2013/0216860 A1 | 8/2013 | Imran et al. | |
| 2015/0185382 A1 * | 7/2015 | Leyder | G02B 5/282 |
| | | | 359/360 |
| 2017/0227694 A1 * | 8/2017 | Nakanishi | B32B 7/02 |

* cited by examiner

SOLAR CONTROL COATING WITH ENHANCED SOLAR CONTROL PERFORMANCE

CROSS REFERENCE TO RELATED APPLICATION

This application claims priority to U.S. Provisional Patent Applications Nos. 62/212,665, filed Sep. 1, 2015, and 62/311,440, filed Mar. 22, 2016, both of which are herein incorporated by reference in their entirety.

BACKGROUND OF THE INVENTION

Field of the Invention

This invention relates generally to a solar control coating having one or more metal functional multi-film layers comprising at least one infrared reflective film and at least one absorptive film.

Technical Considerations

Solar control coatings block or filter selected ranges of electromagnetic radiation, typically radiation in the infrared region and/or ultraviolet region of the electromagnetic spectrum. These solar control coatings are pieced on transparencies, such as windows, to reduce the amount of selected ranges of solar energy entering a building. This reduces the heat buildup inside the building.

The solar heat gain coefficient (SHGC) is a measure of how well the coating blocks solar heat. The lower the SHGC, the more solar heat is blocked, i.e., the lower the solar heat buildup inside the building.

The light to solar gain (LSG) ratio is the ratio of the transmittance of visible light divided by the SHGC.

The overall heat transfer coefficient (U factor) is a measure of heat loss, e.g., through the window. The lower the U factor, the lower the heat transfer through the window, i.e., the higher the insulating level of the window.

While solar control coatings provide good solar insulation properties, it would be useful to improve the solar control properties of these coatings. For example, it would be useful to decrease the SHGC and/or to increase the light to solar gain (LSG) ratio.

To decrease the SHGC, the thicknesses of the infrared reflective metal layers could be increased. However, this would also make the solar control coating more reflective of visible light. Consumers prefer transparencies with high visible light transmittance but low visible light reflectance (both interior and exterior visible light reflectance). Further, increasing the thicknesses of the infrared reflective metal layers increases the sensitivity of the solar control coating to random or systematic variations in the thicknesses of the films making up the coating. This can alter or adversely impact upon the performance of the coating or the aesthetics of the coating. Additionally, increasing the thicknesses of the infrared reflective metal layers tends to decrease the durability of the coating to chemical and/or mechanical attack. Moreover, the accessible regions of the aesthetic/color space that are most broadly appealing and that can be reached using conventional solar control coatings employing one or more periods of dielectric/silver/dielectric structures, are constrained by the designs of conventional solar control coatings.

Therefore, it would be desirable to provide a solar control coating that provides enhanced solar control and/or aesthetic performance. For example, it would be desirable to provide a solar control coating having a low solar heat gain coefficient (SHGC) to prevent heat buildup inside of a building. For example, it would be desirable to provide a solar control coating having a high light to soar gain ratio (LSG). A high LSG indicates good solar heat blocking while allowing visible light to pass through the coating. This improves the natural lighting inside the building. For example, it would be desirable to provide a solar control coating having commercially desirable aesthetics and/or a larger available color space. For example, it would be desirable to provide a non-heat-treated solar control coating having one or more of the above advantages.

SUMMARY OF THE INVENTION

A solar control coating comprises a plurality of phase adjustment layers and a plurality of metal functional layers. At least one of the metal functional layers comprises a metal functional multi-film layer comprising (i) at least one infrared reflective film and (ii) at least one absorptive film comprising copper.

The solar control coating provides 3 mm reference insulating glass unit (3 mm reference IGU) values of luminous transmittance (T) of not greater than 64 percent, a solar heat gain coefficient (SHGC) of not greater than 6.29, and a light to solar gain (LSG) ratio of at least 1.64.

The solar control coating provides 6 mm reference insulating glass unit (6 mm reference IGU) values of luminous transmittance (T) of not greater than 64 percent, a solar heat gain coefficient (SHGC) of not greater than 0.29, and a light to solar gain (LSG) ratio of at least 1.85.

A coated article comprises a first ply having a first major surface and an opposed second major surface. A solar control coating is located over at least one of the major surfaces of the first ply. The solar control coating comprises a plurality of phase adjustment layers and a plurality of metal functional layers. At least one of the metal functional layers comprises a metal functional multi-film layer comprising (i) at least one infrared reflective film and (ii) at least one absorptive film comprising copper.

The solar control coating can be a non-heat-treated solar control coating.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
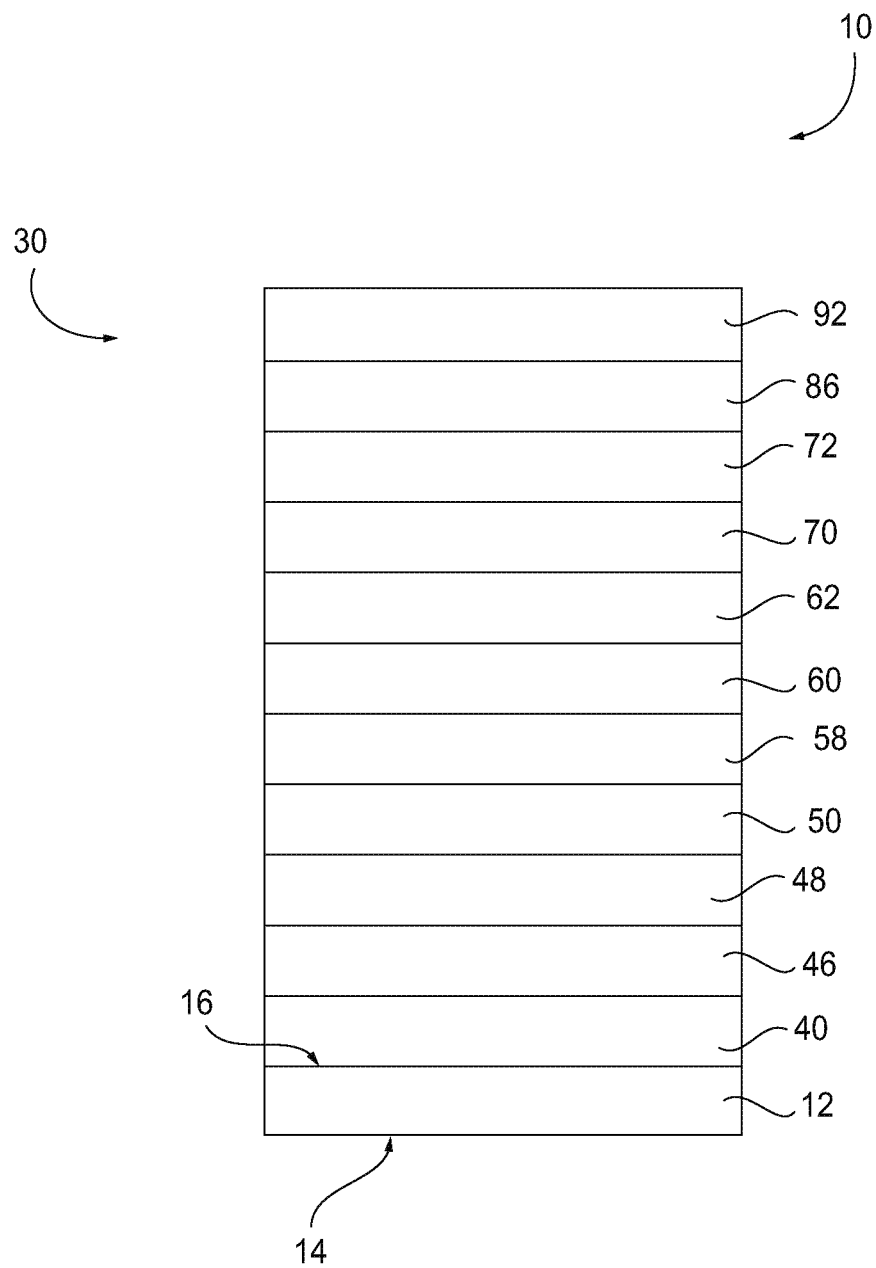
FIG. 1 is a side view (not to scale) of a coated article having a solar control coating of the invention.

Spatial or directional terms, such as "left", "right", "inner", "outer", "above", "below", and the like, relate to the invention as it is shown in the drawing figures. However, the invention can assume various alternative orientations and, accordingly, such terms are not to be considered as limiting.

All numbers used in the specification and claims are to be understood as being modified in all instances by the term "about". By "about" is meant a range of plus or minus ten percent of the stated value.

All ranges disclosed herein encompass the beginning and ending range values and any and all subranges subsumed therein. The ranges disclosed herein represent the average values over the specified range.

With respect to coating layers or films described herein, the term over means farther from the substrate (or base layer) on which the coating layer or film under discussion is located. For example, a second layer located "over" a first layer means that the second layer is located farther from the substrate (or base layer) than is the first layer. The second layer can be in direct contact with the first layer. Alternatively, one or more other layers can be located between the first layer and the second layer.

The term "film" means a region having a chemically distinct and/or homogeneous composition. A "layer" comprises one or more "films". A "coating" comprises one or more "layers".

The terms "polymer" or "polymeric" include oligomers, homopolymers, copolymers, and terpolymers, e.g., polymers formed from two or more types of monomers or polymers.

The term "ultraviolet radiation" means electromagnetic radiation having a wavelength in the range of 100 nm to less than 380 nm. The terms "visible radiation" or "visible light" mean electromagnetic radiation having a wavelength in the range of 380 nm to 780 nm. The term "infrared radiation" means electromagnetic radiation having a wavelength in the range of greater than 780 nm to 100000 nm. The term "solar infrared radiation" means electromagnetic radiation having a wavelength in the range of 1,000 nm to 3,000 nm. The term "thermal infrared radiation" means electromagnetic radiation having a wavelength in the range of greater than 3,000 nm to 100,000 nm.

All documents referred to herein are "incorporated by reference" in their entirety.

The term "optical thickness" means the geometric thickness of the material multiplied by the refractive index of the material at a reference wavelength of 550 nm. For example, a material having a geometric thickness of 5 nm and a refractive index of 2 at a reference wavelength of 550 nm would have an optical thickness of 10 nm.

The terms "tempered" or "heat-treated" mean that the article or coating under discussion has been heated to a temperature sufficient to achieve thermal tempering, heat bending, and/or heat-strengthening. This definition includes, for example, heating the article in an oven or furnace at a temperature of at least 580° C., such as at least 600° C., such as at least 620° C., for a period of time to achieve thermal tempering, heat bending, and/or heat strengthening. For example, the heating can be for a period of time in the range of 1 to 15 minutes, such as 1 to 5 minutes.

The term "non-heat-treated" means not tempered or heat-treated, or not designed to be tempered or heat-treated for final use.

The terms "metal" and "metal oxide" include silicon and silica, respectively, as well as traditionally recognized metals and metal oxides, even though silicon conventionally may not be considered a metal.

By "at least" is meant "greater than or equal to". By "not greater than" is meant "less than or equal to".

Any reference to amounts, unless otherwise specified, is "by weight percent".

Thickness values, unless indicated to the contrary, are geometric thickness values.

A "dopant" is a material present in an amount less than 10 wt. %, such as less than 6 wt. %, such as less than 4 wt. %, such as less than 2 wt. %. For example, less than 1 wt. %. For example, less than 0.5 wt. %. For example, less than 0.1 wt. %.

The term "includes" is synonymous with "comprises".

The term "curable" means a material capable of polymerizing or crosslinking. By "cured" is meant that the material is at least partly polymerized or cross-linked, preferably fully polymerized or cross-linked.

The term "critical thickness" means a geometric thickness above which a material forms a continuous, uninterrupted layer, and below which the material forms discontinuous regions or islands of the material rather than a continuous layer.

The term "effective thickness" refers to the theoretical geometric thickness of a material deposited below its critical thickness but at deposition parameters (e.g., deposition rate, line speed, etc.) which would provide a continuous layer of the material at the reported thickness value if it were deposited above its critical thickness. For example, if a material deposited at a deposition line speed of X cm/sec is known to form a continuous layer having a geometric thickness of 10 nm, then increasing the line speed to 2× would be expected to deposit a coating having a geometric thickness of 5 nm. However, if 5 nm is below the critical thickness of the material, then the deposited coating would not have a continuous, uniform thickness of 5 nm but would form discontinuous or islanded structures. This is referred to herein as a "layer" or a "film" having an "effective thickness" of 5 nm.

A "3 mm reference IGU" is defined as having two spaced apart 3 mm pieces of CLEAR glass separated by a gap of 0.5 inch (1.2 mm) filled with air, with the coating on the No. 2 surface. By "3 mm reference IGU value" is meant the reported value (center of glazing) when the coating is incorporated into a 3 mm reference IGU on the No. 2 surface.

A "6 mm reference IGU" is defined as having two spaced apart 6 mm pieces of CLEAR glass separated by a gap of 0.5 inch (1.2 mm) filled with air, with the coating on the No. 2 surface. By "6 mm reference IGU value" is meant the reported value (center of glazing) when the coating is incorporated into a 6 mm reference IGU on the No. 2 surface.

A "reference laminated unit" is defined as having two plies of 2.1 mm clear glass connected by a 0.76 mm interlayer of polyvinyl butyral and with the coating on the No. 2 surface. A reference laminated unit value means the reported value when the coating is incorporated into a reference laminated unit on the No. 2 surface.

The term "solar control coating" refers to a coating comprised of one or more layers or films that affect the solar properties of the coated article, such as the amount of solar radiation reflected from, absorbed by, or transmitted through the coating.

Optical and solar control performance values (e.g., visible light transmittance and/or haze), unless indicated to the contrary, are those determined using a Perkin Elmer 1050 Spectrophotometer. Reference IGU values (both 3 mm and 6 mm), unless indicated to the contrary, are determined in accordance with OPTICS (v6.0) software and WINDOW (v7.3.4.0) software available from Lawrence Berkeley National Laboratory, measured center of glazing (COG), calculated according to NFRC 2010 (which includes NFRC 100-2010) standard default settings.

U factors, unless indicated to the contrary, are winter/night U factors.

SHGC values, unless indicated to the contrary, are summer/day values.

Sheet resistance values, unless indicated to the contrary, are those determined using a four-point probe (e.g., Nagy Instruments SD-600 measurement device or Alessi four-point probe). Surface roughness values are those determined using an instrument Dimension 3100 Atomic Force Microscope.

Color values (e.g., $L^*$, $a^*$, $b^*$, $C^*$, and hue°) are in accordance with the 1976 CIELAB color system specified by the International Commission on Illumination.

The $L^*$, $a^*$, and $b^*$ values in the specification and claims represent color center point values. A reference IGU (3 mm or 6 mm) or reference laminated unit incorporating the solar control coating of the invention within normal manufacturing variation should have a $\Delta Ecmc$ color difference, relative to the center point value, of less than 4 CMC units (i.e., $\Delta Ecmc<4$), preferably less than 2 CMC units (i.e., $\Delta Ecmc<2$).

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of, the following aspects of the invention, in any combination. Various aspects of the invention are illustrated in separate drawing figures. However, it is to be understood that this is simply for ease of illustration and discussion. In the practice of the invention, one or more aspects of the invention shown in one drawing figure can be combined with one or more aspects of the invention shown in one or more of the other drawing figures.

The invention will be discussed with reference to an architectural transparency. By "architectural transparency" is meant any transparency located on a building, such as a window, IGU, or a sky light. However, it is to be understood that the invention is not limited to use with architectural transparencies but could be practiced with transparencies in any desired field, such as laminated or non-laminated residential and/or commercial windows, and/or transparencies for land, air, space, above water and/or underwater vehicles. Therefore, it is to be understood that the specifically disclosed examples are presented simply to explain the general concepts of the invention, and that the invention is not limited to these specific examples. Additionally, while a typical "transparency" can have sufficient visible light transmission such that materials can be viewed through the transparency, in the practice of the invention, the "transparency" need not be transparent to visible light but may be translucent.

Figure 2:
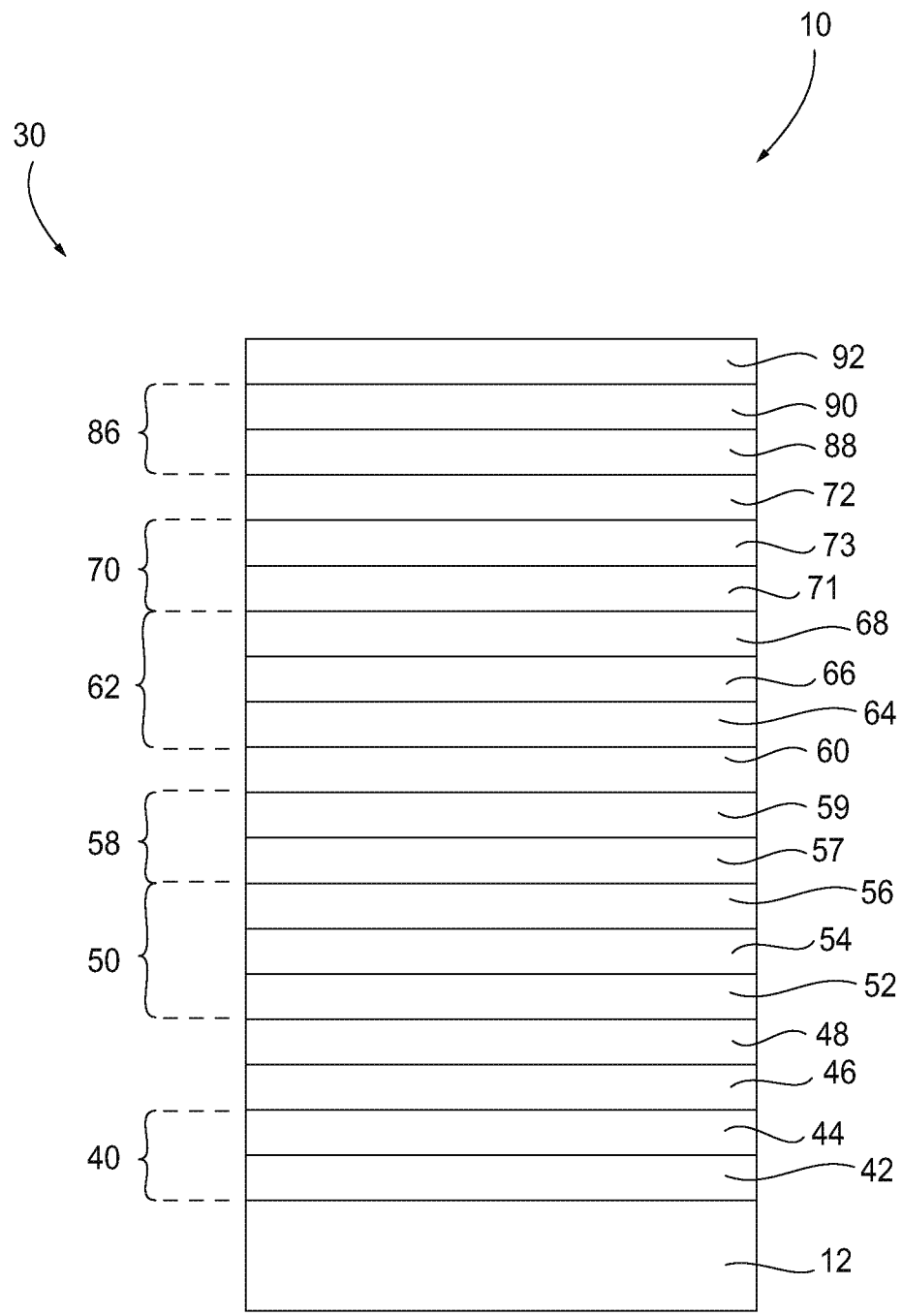
FIG. 2 is a side view (not to scale) of the coated article of FIG. 1 illustrating a multilayer structure of an exemplary solar control coating of the invention.

A coated article 10 incorporating features of the invention is illustrated in FIGS. 1 and 2. The coated article 10 includes a substrate or first ply 12 having a first major surface 14 and an opposed second major surface 16.

A solar control coating 30 of the invention is located over at least one of the major surfaces 14, 16 of the first ply 12. In the examples shown in FIGS. 1 and 2, the solar control coating 30 is located over at least a portion of the second major surface 16 of the first ply 12. As shown in FIG. 1, the solar control coating 30 comprises a first phase adjustment layer 40. A first metal functional layer 46 is located over the first phase adjustment layer 40. An optional first primer layer 48 can be located over the first metal functional layer 46. A second phase adjustment layer 50 is located over the optional first primer layer 48, if present. A second metal functional layer 58 is located over the second phase adjustment layer 50. An optional second primer layer 60 can be located over the second metal functional layer 58. A third phase adjustment layer 62 is located over the optional second primer layer 60, if present. A third metal functional layer 70 is located over the third phase adjustment layer 62. An optional third primer layer 72 can be located over the third metal functional layer 70. A fourth phase adjustment layer 86 is located over the optional third primer layer 72, if present. An optional protective layer 92 can be located over the fourth phase adjustment layer 86. At least one of the metal functional layers 46, 58, 70 comprises a metal functional multi-film layer comprising (i) at least one infrared reflective film and (ii) at least one absorptive film.

The first ply 12 can be transparent or translucent to visible radiation. By "transparent" is meant having visible radiation transmittance of greater than 0% up to 100%. Alternatively, the ply can be translucent. By "translucent" is meant diffusing visible radiation such that objects on the side opposite a viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutylaneterephthalates, and the like; polysiloxane-containing polymers; or copolymers of any monomers for preparing these, or any mixtures thereof); ceramic substrates; glass substrates; or mixtures or combinations of any of the above. For example, the ply can comprise conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be non-heal-treated or heat-treated glass. The glass can be of any type, such as conventional float glass, and can be of any composition having any optical properties, e.g., any value of visible radiation transmittance, ultraviolet radiation transmittance, infrared radiation transmittance, and/or total solar energy transmittance. By "float glass" is meant glass formed by a conventional float process in which molten glass is deposited onto a molten metal bath and controllably cooled to form a float glass ribbon.

The first ply 12 can be clear float glass or can be tinted or colored glass. The first ply 12 can be of any desired dimensions, e.g., length, width, shape, or thickness. Examples of glass that can be used for the practice of the invention include clear glass, Starphire®, Solargreen®, Solextra®, GL-20®, GL-35™, Solarbronze®, Solargray® glass, Pacifica® glass, SolarBlue® glass, and Optiblue® glass, all commercially available from PPG Industries Inc. of Pittsburgh, Pa.

The phase adjustment layers 40, 50, 62, 86 comprise nonmetallic layers. For example, the phase adjustment layers 40, 50, 62, 86 comprise dielectric or semiconductor materials. For example, the phase adjustment layers 40, 50, 62, 86 can comprise oxides, nitrides, oxynitrides, borides, carbides, oxycarbides, borocarbides, boronitrides, carbonitrides, and/or mixtures, combinations, blends, or alloys thereof. Examples of suitable materials for the phase adjustment layers 40, 50, 62, 86 include oxides, nitrides, or oxynitrides of titanium, hafnium, zirconium, niobium, zinc, bismuth, lead, indium, tin, silicon, aluminum, boron, and mixtures, combinations, blends, or alloys thereof. These can have small amounts of other materials. Examples include manganese in bismuth oxide, tin in indium oxide, etc. Additionally, oxides of metal alloys or metal mixtures can be used. Examples include oxides containing zinc and tin (e.g., zinc stannate), oxides of indium-tin alloys, silicon nitrides, silicon aluminum nitrides, or aluminum nitrides. Further, doped metal oxides, suboxides, nitrides, subnitrides, ear oxynitrides can be used. Examples include antimony or indium doped tin oxides or nickel or boron doped silicon oxides. Particular examples of materials include zinc oxides, tin oxides, silicon nitrides, silicon-aluminum nitrides, silicon-nickel nitrides, silicon-chromium nitrides, antimony doped tin oxide, tin doped zinc oxide, aluminum doped zinc oxide, indium doped zinc oxide, titanium oxide, and/or mixtures, combinations, blends, or alloys thereof.

One or more of the phase adjustment layers 40, 50, 62, 86 can comprise a single material. Alternatively, one or more of the phase adjustment layers 40, 50, 62, 86 can comprise multiple materials and/or multiple films. The phase adjustment layers 40, 50, 62, 86 can comprise a stratified sequence of films of chemically distinct materials or phases and/or may comprise one or more composites of one or more chemically distinct materials or phases. The different phase adjustment layers 40, 50, 62, 86 can comprise the same or different materials. The phase adjustment layers 40, 50, 62, 86 can have the same or different thicknesses.

The phase adjustment layers 40, 50, 62, 86 allow adjustment of the constructive and destructive optical interference of electromagnetic radiation partially reflected from, and/or partially transmitted by, the various interface boundaries of the layers of the solar control coating 30. Varying the thicknesses and/or compositions of the phase adjustment layers 40, 50, 62, 86 can change the overall reflectance, transmittance, and/or absorptance of the solar control coating 30, which can alter the solar control performance, thermal infrared insulating performance, color, and/or aesthetics of the solar control coating 30. Additionally, the phase adjustment layers 40, 50, 62, 86 can provide chemical and/or mechanical protection for other layers of the solar control coating 30, such as the metal functional layers.

Where high visible light transmittance is desired, the phase adjustment layers 40, 50, 62, 86 can act as antireflective layers to antireflect the metal functional layers to reduce the overall visible light reflectance and/or increase the visible light transmittance of the solar control coating 30. Materials having refractive indices around 2 are particularly useful for antireflection of metal functional layers.

One or more phase adjustment layers can be located between the ply 12 and the lowermost metal functional layer. One or more phase adjustment layers can be located between the uppermost metal functional layer and the ambient environment, e.g., air.

In the illustrated exemplary coating 30, the first phase adjustment layer 40 is located over at least a portion of the second major surface 16 of the first ply 12. The first phase adjustment layer 40 can be a single layer or can comprise one or more films of antireflective materials and/or dielectric materials described above. The first phase adjustment layer 40 can be transparent to visible light. The first phase adjustment layer 40 may or may not exhibit minimal absorption in one or more regions of the electromagnetic spectrum, for example, visible light.

The first phase adjustment layer 40 can comprise any of the phase adjustment materials described above. For example, the first phase adjustment layer 40 can comprise a metal oxide, a mixture of metal oxides, or a metal alloy oxide. For example, the first phase adjustment layer 40 can comprise doped or non-doped oxides of zinc and tin.

The first phase adjustment layer 40 can have an optical thickness in the range of 40 nm to 100 nm. For example, an optical thickness in the range of 50 nm to 90 nm. For example, an optical thickness in the range of 70 nm to 80 nm. For example, an optical thickness in the range of 75 nm to 76 nm.

The first phase adjustment layer 40 can have a geometric thickness in the range of 20 nm to 50 nm. For example, a geometric thickness in the range of 25 nm to 45 nm. For example, a geometric thickness in the range of 35 nm to 40 nm. For example, a geometric thickness in the range of 37 nm to 38 nm.

As shown in FIG. 2, the first phase adjustment layer 40 can comprise a multi-film structure having a first film 42 and a second film 44. The second film 44 can be located over the first film 42.

The first film 42 can comprise, for example, an oxide of a metal alloy or a mixture of metal oxides. For example, the first film 42 can be an oxide of an alloy of zinc and tin. By "an alloy of zinc and tin" is meant both true alloys and also mixtures. The oxide of an alloy of zinc and tin can be that obtained from magnetron sputtering vacuum deposition (MSVD) from a cathode of zinc and tin. The cathode can comprise zinc and tin in proportions of 5 wt. % to 95 wt. % zinc and 95 wt. % to 5 wt. % tin, such as 10 wt. % to 90 wt. % zinc and 90 wt. % to 10 wt. % tin. However, other ratios of zinc to tin could also be used. An exemplary oxide of a metal alloy for the first film 42 can be written as $Zn_xSn_{1-x}O_{2-x}$ (Formula 1) where "x" varies in the range of greater than 0 to less than 1. For instance, "x" can be greater than 0 and can be any fraction or decimal greater than 0 and less than 1. The stoichiometric form of Formula 1 is "$Zn_2SnO_4$", commonly referred to as zinc stannate. A zinc stannate layer can be sputter deposited from a cathode having 52 wt. % zinc and 48 wt. % tin in the presence of oxygen. For example, the first film 42 can comprise zinc stannate.

A doped zinc oxide can be deposited from a zinc cathode that includes another material to improve the sputtering characteristics of the cathode. For example, the zinc cathode can include a small amount of tin (e.g., up to 10 wt. %, such as up to 5 wt. %) to improve sputtering. In which case, the resultant zinc oxide film would include a small percentage of tin oxide, e.g., up to 10 wt. % tin oxide, e.g., up to 5 wt. % tin oxide. Examples of the other materials include aluminum, indium, and combinations thereof. Preferably, the other material comprises tin. A tin doped zinc oxide material deposited from a cathode comprising 90 wt. % zinc and 10 wt. % tin, in the presence of oxygen, is referred to herein as ZnO 90/10.

The second film 44 can comprise a metal oxide, a doped metal oxide, or an oxide mixture. The second film 44 can comprise a metal oxide or a doped metal oxide. For example, the second film 44 can comprise zinc oxide or doped zinc oxide. For example, the second film 44 can comprise tin doped zinc oxide. For example, the second film 44 can comprise ZnO 90/10.

The first film 42 can have an optical thickness in the range of 30 nm to 70 nm. For example, an optical thickness in the range of 40 nm to 60 nm. For example, an optical thickness in the range of 44 nm to 54 nm. For example, an optical thickness in the range of 49 nm to 52 nm.

The first film 42 can have a geometric thickness in the range of 15 nm to 35 nm. For example, a geometric thickness in the range of 20 nm to 30 nm. For example, a geometric thickness in the range of 22 nm to 27 nm. For example, a geometric thickness in the range of 24 nm to 25 nm.

The second film 44 can have an optical thickness in the range of 10 nm to 40 nm. For example, an optical thickness in the range of 16 nm to 38 nm. For example, an optical thickness in the range of 20 nm to 30 nm. For example, an optical thickness in the range of 26 nm to 28 nm.

The second film 44 can have a geometric thickness in the range of 5 nm to 20 nm. For example, a geometric thickness in the range of 8 nm to 18 nm. For example, a geometric thickness in the range of 10 nm to 15 nm. For example, a geometric thickness in the range of 13 nm to 14 nm.

The metal functional layers 46, 58, 70 can be single films. For example, the metal functional layers 46, 58, 70 can each comprise a continuous metal film. By "continuous" metal film is meant an unbroken or non-disconnected film, such as a homogeneous film.

Or, one or more of the metal functional layers 45, 58, 70 can be a metal functional multi-film layer. By "metal functional multi-film layer" is meant a layer comprising (i) at least one infrared reflective film and (ii) at least one absorptive film. The infrared reflective film can have reflectivity in the solar infrared and/or thermal infrared portions of the electromagnetic spectrum. The absorptive film can exhibit enhanced absorptivity in one or more portions of the electromagnetic spectrum. For example, enhanced absorptivity in the visible radiation region and/or the infrared radiation region and/or the ultraviolet radiation region of the electromagnetic spectrum.

A metal functional multi-film layer can comprise an absorptive film over an infrared reflective film. The absorptive film can be in direct contact with an overlying optional primer layer.

A metal functional multi-film layer can comprise an infrared reflective film over an absorptive film. The absorptive film can be in direct contact with the underlying phase adjustment layer.

A metal functional multi-film layer can comprise an infrared reflective film located between two absorptive films. The upper absorptive film can be in direct contact with an overlying optional primer layer. The lower absorptive film can be in direct contact with the underlying phase adjustment layer. Optionally, a primer layer can be located between the lower absorptive film and the underlying phase adjustment layer.

Examples of infrared reflective films include continuous metal films. Examples of infrared reflective metals useful for the infrared reflective films include noble or near noble metals. Examples of such metals include silver, gold, platinum, palladium, osmium, iridium, rhodium, ruthenium, copper, mercury, rhenium, aluminum, and combinations, mixtures, blends, or alloys thereof. For example, one or more of the metal functional films can comprise a continuous metallic silver film.

Examples of absorptive materials for the absorptive film include metals, such as gold, silver, copper, nickel, palladium, platinum, tungsten, rhodium, iridium, tantalum, iron, tin, aluminum, lead, zinc, chromium, molybdenum, niobium, cobalt, manganese, titanium, silicon, chromium, and combinations, mixtures, blends, or alloys thereof. For example, one or more of the absorptive films can comprise copper. One or more of the absorptive films can comprise alloys or super alloys of two or more of the above materials. For example, alloys of nickel, chromium, or nickel and chromium. For example, Inconel® 600, Inconel® 617, Inconel® 625, Inconel® 690, and/or Inconel® 718.

The first metal functional layer 46 can comprise a metal functional multi-film layer as described above.

Alternatively, the first metal functional layer 46 can comprise a single infrared reflective film comprising any of the above infrared reflective metals. For example, the first metal functional layer 46 can comprise a continuous film of metallic layer.

The first metal functional layer 46 can have a geometric thickness in the range of 5 nm to 25 nm. For example, a geometric thickness in the range of 7 nm to 20 nm. For example, a geometric thickness in the range of 10 nm to 15 nm. For example, a geometric thickness in the range of 11.5 nm to 12.5 nm.

Optional primer layers 48, 60, 72 can be located in direct contact with the associated underlying metal functional layers. The primer layers 48, 60, 72 protect the associated metal functional layers during the coating process and/or subsequent processing, such as thermal tempering. The primer material is deposited as a metal. During subsequent processing, such as the deposition of the overlying phase adjustment layer and/or thermal tempering, some or all of the metal primer oxidizes. When oxide or nitride materials are used in the phase adjustment layers, the primer layers 48, 60, 72 can comprise oxophillic or nitrophillic materials, respectively. The primer layers 48, 60, 72 need not be all the same material. The primer layers 48, 60, 72 need not be of the same thickness.

Examples of materials useful for the primer layers 48, 60, 72 include titanium, niobium, tungsten, nickel, chromium, iron, tantalum, zirconium, aluminum, silicon, indium, tin zinc, molybdenum, hafnium, bismuth, vanadium, manganese, and combinations, mixtures, blends, or alloys thereof.

The optional first primer layer 48 can be located over the first metal functional layer 46. The first primer layer 48 can be a single film or a multiple film layer. The first primer layer 48 can comprise any of the primer materials described above. For example, the first primer layer 48 can comprise titanium. For exam*, the first primer layer 48 can be deposited as titanium metal.

The first primer layer 48 can have a geometric thickness or effective thickness in the range of 0.5 nm to 10 nm. For example, in the range of 1 nm to 5 nm. For example, in the range of 1.5 nm to 2.5 nm. For example, 2 nm.

The second phase adjustment layer 50 is located over the first metal functional layer, such as over the optional first primer layer 48, if present. The second phase adjustment layer 50 can comprise one or more of the phase adjustment materials and/or films described above for the phase adjustment layers.

The second phase adjustment layer 50 can have an optical thickness in the range of 80 nm to 200 nm. For example, an optical thickness in the range of 100 nm to 160 nm. For example, an optical thickness in the range of 130 nm to 140 nm. For example, an optical thickness in the range of 136 nm to 138 nm.

The second phase adjustment layer 50 can have a geometric thickness in the range of 40 nm to 100 nm. For example, a geometric thickness in the range of 50 nm to 80 nm. For example, a geometric thickness in the range of 65 nm to 70 nm. For example, a geometric thickness in the range of 68 nm to 69 nm.

The second phase adjustment layer 50 can be a single film or a multi-film structure. For example, the second phase adjustment layer 50 can include a first film 52, a second film 54, and a third film 56.

The first film 52 and/or the third film 56 can comprise a metal oxide or a doped metal oxide. For example, the first film 52 and/or the third film 56 can comprise zinc oxide or doped zinc oxide. For example, the first film 52 and/or the third film 56 can comprise tin doped zinc oxide. For example, the first film 52 and/or the third film 56 can comprise ZnO 90/10.

The second film 54 can comprise an oxide of a metal alloy. For example, an oxide comprising zinc and tin. For example, the second film 54 can comprise zinc stannate.

The first film 52 (and/or the third film 56) can have an optical thickness in the range of 10 nm to 40 nm. For example, an optical thickness in the range of 16 nm to 38 nm. For example, an optical thickness in the range of 20 nm to 35 nm. For example, an optical thickness in the range of 28 nm to 30 nm. The first film 52 and the third film 56 can comprise the same or different materials and can be of the same or different thickness.

The first film 52 (and/or third film 56) can have a geometric thickness in the range of 5 nm to 20 nm. For example, a geometric thickness in the range of 5 nm to 16 nm. For example, a geometric thickness in the range of 10 nm to 16 nm. For example, a geometric thickness in the range of 14 nm to 15 nm.

The second film 54 can have an optical thickness in the range of 50 nm to 100 nm. For example, an optical thickness in the range of 70 nm to 90 nm. For example, an optical thickness in the range of 76 nm to 80 nm. For example, an optical thickness in the range of 78 nm to 79 nm.

The second film 54 can have a geometric thickness in the range of 25 nm to 50 nm. For example, a geometric thickness in the range of 35 nm to 45 nm. For example, a geometric thickness in the range of 38 nm to 42 nm. For example, a geometric thickness in the range of 39 nm to 40 nm.

The second metal functional layer 58 is located over the second phase adjustment layer 50. The second metal functional layer 56 can be a single film comprising an infrared reflective film 57. Alternatively, the second metal functional layer 58 can comprise a multi-film layer. In the example illustrated in FIG. 2, the second metal functional layer 58 is a metal functional multi-film layer comprising the infrared reflective film 57 and an absorptive film 59. The absorptive film 59 can be located over or under the infrared reflective film 57. Preferably, the absorptive film 59 is located over the infrared reflective film 57.

The infrared reflective film 57 comprises any of the infrared reflective materials described above. For example, a continuous metal film. For example, a continuous silver film.

The infrared reflective film 57 can have a geometric thickness in the range of 5 nm to 25 nm. For example, a geometric thickness in the range of 7 nm to 20 nm. For example, a geometric thickness in the range of 10 nm to 18 nm. For example, a geometric thickness in the range of 15 nm to 16 nm.

The absorptive film 59 can include any of the absorptive materials described above. For example, the absorptive film 59 can comprise an alloy of nickel and chromium. For example, the absorptive film 59 can comprise Inconel® 600, Inconel® 617, Inconel® 625, Inconel® 690, and/or Inconel® 718. For example, the absorptive film 59 can comprise Inconel® 600.

The absorptive film 59 can have an effective thickness in the range of 0 nm to 2 nm. For example, an effective thickness in the range of 0.1 nm to 1.6 nm. For example, an effective thickness in the range of 0.25 nm to 1 nm. For example, an effective thickness in the range of 0.5 nm to 0.75 nm.

The optional second primer layer 60 can be located over the second metal functional layer 58. The second primer layer 60 can include of any of the primer materials and can be any of the thicknesses described above with respect to the optional first primer layer 48. For example, the second primer 60 can comprise titanium.

The second primer layer 60 can have a geometric thickness or effective thickness in the range of 0.5 nm to 10 nm. For example, a geometric thickness or effective thickness in the range of 1 nm to 5 nm. For example, a geometric thickness or effective thickness in the range of 1.5 nm to 2.5 nm. For example, a geometric thickness or effective thickness in the range of 2 nm to 2.25 nm.

The third phase adjustment layer 62 is located over the second metal functional layer 58, such as over the optional second primer layer 60, if present. The third phase adjustment layer 62 can include any of the phase adjustment materials and/or films as discussed above with respect to the first and second phase adjustment layers 40, 50. For example, the third phase adjustment layer 62 can be a multi-film structure. For example, the third phase adjustment layer 62 can include a first film 64, a second film 66, and a third film 68.

The third phase adjustment layer 62 can have an optical thickness in the range of 90 nm to 200 nm. For example, an optical thickness in the range of 120 nm to 180 nm. For example, an optical thickness in the range of 160 nm to 170 nm. For example, an optical thickness in the range of 158 nm to 159 nm.

The third phase adjustment layer 62 can have a geometric thickness in the range of 45 nm to 100 nm. For example, a geometric thickness in the range of 60 nm to 90 nm. For example, a geometric thickness in the range of 75 nm to 85 nm. For example, a geometric thickness in the range of 79 nm to 80 nm.

The first film 64 and/or third film 68 can comprise a metal oxide or a doped metal oxide. For example, zinc oxide or doped zinc oxide. For example, tin doped zinc oxide. For example, ZnO 90/10. The second film 66 can comprise an oxide of a metal alloy. For example, an oxide comprising zinc and tin. For example, zinc stannate.

The first film 64 (and/or third film 68) can have an optical thickness in the range of 10 nm to 40 nm. For example, an optical thickness in the range of 16 nm to 38 nm. For example, an optical thickness in the range of 20 nm to 30 nm. For example, an optical thickness in the range of 28 nm to 29 nm. The first film 64 and the third film 68 can be of the same or different thickness.

The first film 64 (and/or third film 68) can have a geometric thickness in the range of 5 nm to 20 nm. For example, a geometric thickness in the range of 8 nm to 18 nm. For example, a geometric thickness in the range of 10 nm to 15 nm. For example, a geometric thickness in the range of 13 nm to 14 nm.

The second film 66 can have an optical thickness in the range of 70 nm to 140 nm. For example, an optical thickness in the range of 80 nm to 120 nm. For example, an optical thickness in the range of 90 nm to 110 nm. For example, an optical thickness in the range of 102 nm to 104 nm.

The second film 66 can have a geometric thickness in the range of 35 nm to 70 nm. For example, a geometric thickness in the range of 40 nm to 60 nm. For example, a geometric thickness in the range of 45 nm to 55 nm. For example, a geometric thickness in the range of 51 nm to 52 nm.

The third metal functional layer 70 can be a single film or a multi-film structure. In the example illustrated in FIG. 2, the third metal functional layer 70 is a metal functional multi-film layer comprising an absorptive film 71 and an infrared reflective film 73. The metal functional multi-film layer of the third metal functional layer 70 can have any of the film orientations described above for the second metal functional layer 58. The absorptive film 71 can be located over or under the infrared reflective film 73. The absorptive film 71 can be located under the infrared reflective film 73.

The absorptive film 71 can include any of the absorptive materials described above. For example, the absorptive film 71 can be a metallic film. For example, the absorptive film 71 can comprise gold silver, copper, nickel, iron, tin, aluminum, lead, zinc, chromium, and combinations thereof. For example, copper.

The absorptive film 71 can have a physical or effective thickness in the range of 1 nm to 10 nm. For example, in the range of 2.5 nm to 4.5 nm. For example, in the range of 3 nm to 4 nm. For example, in the range of 3.5 nm to 3.75 nm.

The infrared reflective film 73 can be a continuous metal film. For example, a continuous metallic film. For example, a metallic silver film.

The infrared reflective film 73 can have a geometric thickness in the range of 5 nm to 30 nm. For example, a geometric thickness in the range of 10 nm to 25 nm. For example, a geometric thickness in the range of 15 nm to 20 nm. For example, a geometric thickness in the range of 18 nm to 19 nm.

The optional third primer layer 72 can include any of the primer materials described above. For example, the third primer layer 72 can comprise titanium.

The third primer layer 72 can have a geometric thickness or effective thickness in the range of 0.5 nm to 10 nm. For example, in the range of 1 nm to 5 nm. For example, in the range of 1.5 nm to 2.5 nm. For example, in the range of 2 nm to 2.3 nm.

The fourth phase adjustment layer 86 can comprise one or more of the phase adjustment materials and/or films discussed above with respect to the first, second, or third phase adjustment layers 40, 50, 62.

The fourth phase adjustment layer 86 can have an optical thickness in the range of 30 nm to 100 nm. For example, an optical thickness in the range of 40 nm to 80 nm. For example, an optical thickness in the range of 50 nm to 70 nm. For example, an optical thickness in the range of 58 nm to 59 nm.

The fourth phase adjustment layer 86 can have a geometric thickness in the range of 15 nm to 50 nm. For example, a geometric thickness in the range of 20 nm to 40 nm. For example, a geometric thickness in the range of 25 nm to 35 nm. For example, a geometric thickness in the range of 29 nm to 30 nm.

The fourth phase adjustment layer 86 can comprise a first film 88 and a second film 90.

The first film 88 can comprise a metal oxide or a doped metal oxide. For example, zinc oxide or doped zinc oxide. For example, tin doped zinc oxide. For example, ZnO 90/10. The second film 90 can comprise an oxide of a metal alloy. For example, an oxide comprising zinc and tin. For example, zinc stannate.

The first film 88 can have an optical thickness in the range of 4 nm to 40 nm. For example, an optical thickness in the range of 10 nm to 30 nm. For example, an optical thickness in the range of 14 nm to 22 nm. For exam*, en optical thickness in the range of 18 nm to 19 nm.

The first film 88 can have a geometric thickness in the range of 2 nm to 20 nm. For example, a geometric thickness in the range of 5 nm to 16 nm. For example, a geometric thickness in the range of 7 nm to 11 nm. For example, a geometric thickness in the range of 9 nm to 10 nm.

The second film 90 can have an optical thickness in the range of 10 nm to 80 nm. For example, an optical thickness in the range of 20 nm to 60 nm. For example, an optical thickness in the range of 30 nm to 60 nm. For example, en optical thickness in the range of 40 nm to 45 nm.

The second film 90 can have a geometric thickness in the range of 5 nm to 40 nm. For example, a geometric thickness in the range of 10 nm to 30 nm. For example, a geometric thickness in the range of 15 nm to 26 nm. For example, a geometric thickness in the range of 20 nm to 22 nm.

The optional protective layer 92 can be the terminal layer of the solar control coating 30. The optional protective layer 92 can comprise one or more nonmetallic materials, such as those described above with regard to the phase adjustment layers. Alternatively, the protective layer 92 can comprise a metal material. The optional protective layer 92 can provide chemical and/or mechanical protection to the underlying coating layers. The optional protective layer 92 can provide phase adjustment and/or absorption. The protective layer 92 can be a single film or have a multi-film structure.

In addition to or instead of the terminal optional protective layer 92, one or more other optional protective layers 92 can be located within the solar control coating 30. For example, between two or more of the phase adjustment layers.

The optional protective layer 92 can include, for example, a metal oxide or metal nitride material. For example, the protective layer 92 can comprise an oxide of titanium, for example titanium dioxide (i.e., titania).

The optional protective layer 92 can have an optical thickness in the range of 1 nm to 30 nm. For example, an optical thickness in the range of 2 nm to 20 nm. For example, an optical thickness in the range of 4 nm to 14 nm. For example, an optical thickness in the range of 10 nm to 12 nm.

The optional protective layer 92 can have a geometric thickness or effective thickness in the range of 0.5 nm to 15 nm. For example, in the range of 1 nm to 10 nm. For example, in the range of 2 nm to 7 nm. For example, in the range of 5 nm to 6 nm.

The solar control coating 30 can be a non-heat-treated coating.

The layers and/or films of the solar control coating 30 can be formed by any conventional method. Examples of such methods include conventional chemical vapor deposition (CVD) and/or physical vapor deposition (PVD) methods. Examples of CVD processes include spray pyrolysis. Examples of PVD processes include electron beam evaporation and vacuum sputtering, such as magnetron sputter vapor deposition (MSVD). Other coating methods could also be used, such as, but not limited to, sol-gel deposition. One or more layers or films can be formed by one method and one or more other layers or films can be formed by a different method. For example, the coating 30 can be formed by MSVD.

Figure 3:
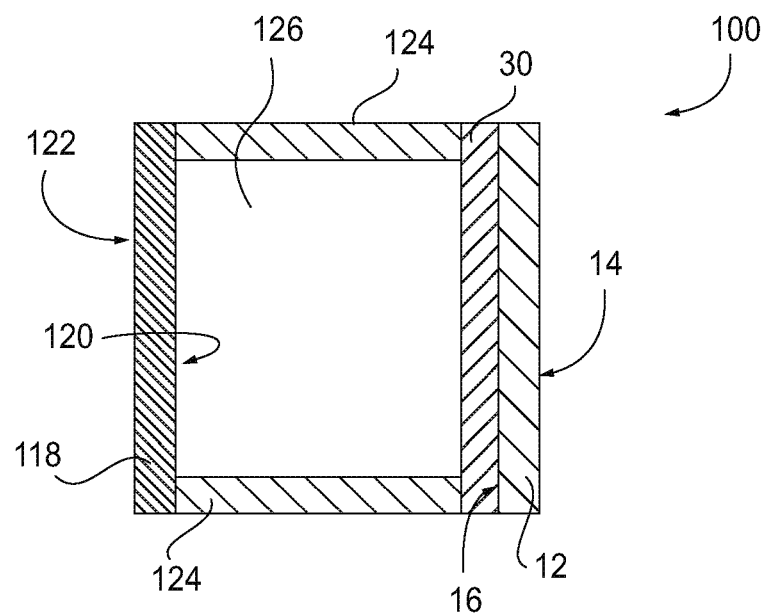
FIG. 3 is a side view (not to scale) of the solar control coating of FIG. 1 or 2 incorporated into an insulating glass unit (IGU)

FIG. 3 shows the coated article 10 of FIGS. 1 and 2 incorporated into an insulating glass unit (IGU) 100. The first major surface 14 (No. 1 surface) faces the building exterior, i.e., is an outer major surface, and the second major surface 16 (No. 2 surface) faces the interior of the building.

The insulating glass unit 100 includes a second ply 118 having an outwardly facing major surface 120 (No. 3 surface) and an inwardly facing major surface 122 (No. 4 surface). This numbering of the ply surfaces is in keeping with conventional practice in the fenestration art.

The second ply 118 is spaced from the first ply 12. The first and second plies 12, 118 can be connected together in any suitable manner, such as by being adhesively bonded to a conventional spacer frame 124. A gap or chamber 126 is formed between the two plies 12, 118. The chamber 126 can be filled with a selected atmosphere, such as gas, for example, air or a non-reactive gas such as argon or krypton gas. In the illustrated example, the solar control coating 30 located on the No. 2 surface 16. However, the solar control coating 30 could be located on any of the other surfaces. For example, the solar control coating 30 could be located on the No. 3 surface 120. For example, the solar control coating 30 could be located on the No. 1 surface 14 or the No. 4 surface 122.

The second ply 118 can be of any of the materials described above for the first ply 12. The second ply 118 can be the same as the first ply 12 or the second ply 118 can be different than the first ply 12. The first and second plies 12, 118 can each be, for example, clear float glass or can be tinted or colored glass or one ply 12, 118 can be clear glass and the other ply 12, 118 colored glass.

Figure 4:
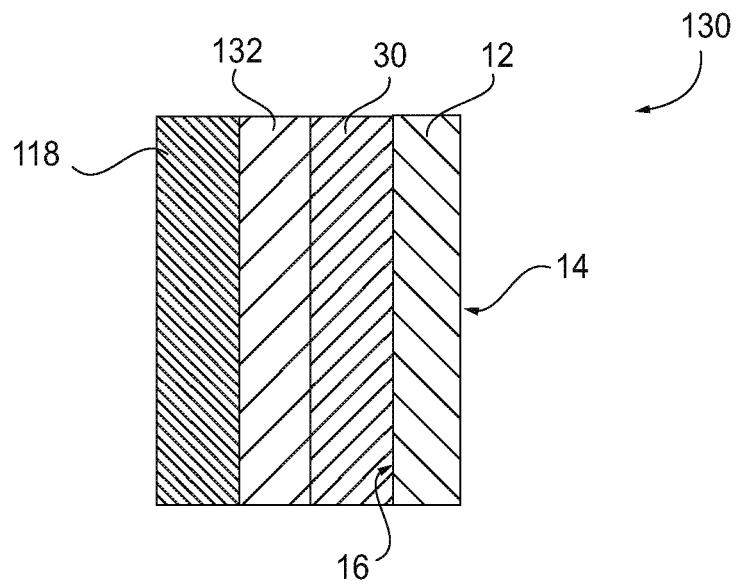
FIG. 4 is a side view (not to scale) of the solar control coating of FIG. 1 or 2 incorporated into a laminated unit.

FIG. 4 shows the coated article 10 incorporated into a laminated unit 130. The laminated unit 130 includes the first ply 12 and the second ply 118 connected by a polymeric interlayer 132. The solar control coating 30 is shown on the No. 2 surface 16. However, as with the IGU 100 described above, the solar control coating 30 could be on any of the surfaces 14, 16, 120, or 122.

The solar control coating 30 provides a 3 mm reference IGU SHGC of not greater than 0.3. For example, not greater than 0.29. For example, not greater than 0.28. For example, not greater than 0.27. For example, not greater than 0.26. For example, not greater than 0.25. For example, not greater than 0.24.

The solar control coating 30 provides a 3 mm reference IGU SHGC in the range of 0.2 to 0.3. For example, in the range of 0.2 to 0.29, such as 0.2 to 0.26, such as 0.2 to 0.24, such as 0.21 to 0.25. For example, in the range of 0.22 to 0.235.

The solar control coating 30 provides a 3 mm reference IGU visible light transmittance of not greater than 70%. For example, not greater than 65%. For example, not greater than 60%. For example, not greater than 57%. For example, not greater than 55%. For example, in the range of 40% to 65%. For example, in the range of 50% to 55%. For example, in the range of 51% to 54.5%.

The solar control coating 30 provides a 3 mm reference IGU visible light exterior reflectance of not greater than 25%. For example, not greater than 20%. For example, not greater than 15%. For example, not greater than 14%. For example, in the range of 10% to 15%. For example, in the range of 12% to 13.5%.

The solar control coating 30 provides a 3 mm reference IGU visible light interior reflectance of not greater than 25%. For example, not greater than 22%. For example, not greater than 20%. For example, in the range of 16% to 22%. For example, in the range of 18% to 20%.

The solar control coating 30 provides a 3 mm reference IGU LSG ratio of at least 1.8. For example, at least 1.85. For example, at least 1.9. For example, at least 2. For example, in the range of 1.6 to 2.5. For example, in the range of 2.1 to 2.4. For example, in the range of 2.2 to 2.37.

The solar control coating 30 provides a 3 mm reference IU transmitted L* in the range of 74 to 80. For example in the range of 75 to 79. For example in the range of 76.5 to 78.5.

The solar control coating 30 provides a 3 mm reference IGU transmitted a* in the range of −6 to −3. For example in the range of −5.5 to −4. For example in the range of −5.2 to −4.25.

The solar control coating 30 provides a 3 mm reference IGU transmitted b* in the range of 0 to 6. For example in the range of 1 to 5. For example in the range of 2.8 to 4.8.

The solar control coating 30 provides a 3 mm reference IGU exterior reflected L* in the range of 30 to 50. For example in the range of 35 to 49. For example in the range of 41.9 to 43.2.

The soar control coating 30 provides a 3 mm reference IGU exterior reflected a* in the range of −4 to 0. For example in the range of −3 to −1. For example in the range of −2.7 to −1.8.

The solar control coating 30 provides a 3 mm reference IGU exterior reflected b* in the range of −7 to 0. For example in the range of −6 to −1. For example in the range of 5.6 to −4.1.

The solar control coating 30 provides as 3 mm reference IGU interior reflected L* in the range of 35 to 55. For example in the range of 40 to 52. For example in the range of 48 to 52.

The solar control coating 30 provides a 3 mm reference IGU interior reflected a* in the range of −8 to 0. For example in the range of −6.2 to −1. For example in the range of 5.9 to −4.5.

The solar control coating 30 provides a 3 mm reference IGU interior reflected b* in the range of −5 to 0. For example in the range of −4 to −1. For example in the range of −3.5 to −2.

The solar control coating 30 provides a sheet resistance of less than 10 ohms per square (MD). For example, less than 5Ω/☐. For example, less than 2Ω/☐. For example, less than 1Ω/☐. For example, in the range of greater than 0 to 1.5. For example, in the range of greater than 0 to 1.

The solar control coating 30 can have an emissivity in the range of 0.02 to 0.04, For example, in the range of 0.023 to 0.037.

The solar control coating 30 provides a 3 mm reference IGU Winter/night U factor in the range of 0.9 to 3 Watt per square meter Kelvin (W/m2-K). For example, in the range of 1 to 2.5 W/m2-K. For example, in the range of 1.5 to 1.7 W/m2-K. For example, in the range of 1.6 to 1.67 W/m2-K.

The solar control coating 30 provides a 3 mm reference IGU Summer/day factor in the range of 1.4 to 1.6 W/m2-K. For example, in the range of 1.52 to 1.57 W/m2-K.

The solar control coating 30 provides a reference laminated unit transmitted L* in the range of 65 to 85. For example, in the range of 72 to 80. For example, in the range of 75 to 77.

The solar control coating 30 provides a reference laminated unit transmitted a* in the range of 2 to −8. For example, in the range of 1 to −4. For example, in the range of −0.5 to −2.5.

The solar control coating 30 provides a reference laminated unit transmitted b* in the range of 2 to 8. For example, in the range of 3 to 7.5. For example, in the range of 4.5 to 6.5.

The solar control coating 30 provides a reference laminated unit reflected (exterior) L* in the range of 40 to 55. For example, in the range of 44 to 50. For example, in the range of 45.5 to 47.5.

The solar control coating 30 provides a reference laminated unit reflected (exterior) a* in the range of −6 to −16. For example, in the range of −8 to −15. For example, in the range of −10 to −12.

The solar control coating 30 provides a reference laminated unit reflected (exterior) b* in the range of 0 to −8. For example, in the range of −2 to −8. For example, in the range of −3 to −5.

The solar control coating 30 provides a reference laminated unit reflected (interior) L* in the range of 45 to 65. For example, in the range of 50 to 60. For example, in the range of 54.5 to 56.5.

The solar control coating 30 provides a reference laminated unit reflected (interior) a* in the range of −6 to −16. For example, in the range of −8 to −14. For example, in the range of −10 to −12.

The solar control coating 30 provides a reference laminated unit reflected (interior) b* in the range of −3.5 to −10. For example, in the range of −4.5 to −8.5. For example, in the range of −5.5 to −7.5.

EXAMPLES

Table 1 shows exemplary coatings of the invention. The reported thicknesses are geometric thicknesses in nanometers (nm). ZS means zinc stannate deposited from a cathode having 52 wt. % zinc and 48 wt. % tin in the presence of oxygen. TZO means tin doped zinc oxide deposited from a cathode with 10 wt. % tin and 90 wt. % zinc in the presence of oxygen (i.e., ZnO 90/10). Ag means silver. TiOx means a titanium primer layer deposited as a metal and oxidized during processing. INC means Inconel® 600. Cu means metallic copper. $TiO_2$ means an oxide of titanium, for example titanium dioxide (titania).

TABLE 1

| Sample | ZS | TZO | Ag | $T_iO_x$ | TZO | ZS | TZO | Ag | INC | $T_iO_x$ | TZO | ZS | TZO | Cu | Ag | $T_iO_x$ | TZO | ZS | $T_iO_2$ |
|---|---|---|---|---|---|---|---|---|---|---|---|---|---|---|---|---|---|---|---|
| 1 | 26.2 | 13.5 | 12.1 | 2.1 | 15.6 | 34.5 | 15.7 | 13.9 | 0.4 | 2.0 | 10.2 | 58.9 | 10.2 | 3.9 | 17.9 | 2.4 | 10.6 | 18.0 | 4.9 |
| 2 | 18.0 | 16.2 | 12.9 | 1.4 | 16.1 | 34.3 | 15.8 | 14.8 | 0.0 | 2.0 | 10.8 | 56.6 | 10.8 | 3.7 | 18.3 | 2.1 | 10.7 | 17.8 | 5.1 |
| 3 | 19.7 | 17.7 | 13.0 | 1.4 | 16.0 | 35.3 | 16.3 | 15.3 | 0.0 | 2.1 | 11.0 | 57.5 | 11.2 | 3.4 | 18.6 | 2.1 | 10.7 | 17.8 | 5.2 |
| 4 | 19.7 | 17.7 | 13.0 | 1.4 | 16.0 | 35.3 | 16.3 | 15.3 | 0.4 | 2.1 | 11.0 | 57.5 | 11.2 | 3.4 | 18.6 | 2.1 | 10.7 | 17.8 | 5.2 |
| 5 | 22.5 | 16.1 | 12.2 | 1.0 | 15.9 | 34.4 | 16.1 | 14.9 | 0.25 | 1.1 | 11.1 | 57.2 | 11.5 | 3.6 | 18.1 | 1.8 | 10.0 | 17.7 | 5.3 |

Tables 2 and 3 show 3 mm reference IGU values for the Samples of Table 1. T(V) means percent visible light transmittance. RE(V) means percent exterior reflectance of visible radiation. RI(V) means percent interior reflectance of visible radiation. T(S) means percent solar radiation transmittance. RE(S) means percent exterior reflectance of solar radiation. RI(S) means percent interior reflectance of solar radiation. UV(T) means percent ultraviolet radiation transmittance. UF(W) means winter/night U factor (W/m2-k). UF(S) means summer/day U factor (W/m2-K). SC means shading coefficient. LIT), a*(T), and b*(T) mean the transmitted L.*, a*, b*. L*(RE), a*(RE), and b*(IRE) mean the reflected exterior L*, a*, b*.

TABLE 2

| Sample | T(V) | RE(V) | RI(V) | T(S) | RE(S) | RI(S) | UV(T) | UF(W) | UF(S) |
|---|---|---|---|---|---|---|---|---|---|
| 1 | 54.3% | 13.1% | 18.7% | 19.7% | 45.4% | 48.0% | 3.5% | 1.657 | 1.543 |
| 2 | 51.1% | 13.2% | 17.9% | 18.8% | 44.8% | 46.9% | 4.0% | 1.669 | 1.561 |
| 3 | 52.7% | 13.2% | 18.2% | 19.2% | 45.2% | 47.4% | 3.7% | 1.671 | 1.564 |
| 4 | 53.2% | 13.2% | 18.4% | 19.5% | 48.1% | 47.3% | 3.8% | 1.673 | 1.567 |
| 5 | 52.5% | 12.5% | 19.6% | 19.9% | 45.2% | 48.3% | 8.1% | 1.645 | 1.526 |

TABLE 3

| Sample | SC | SHGC | LSG | L*(T) | a*(T) | b*(T) | L*(RE) | a*(RE) | b*(RE) | L*(RI) | a*(RI) | b*(RI) |
|---|---|---|---|---|---|---|---|---|---|---|---|---|
| 1 | 0.263 | 0.229 | 2.37 | 78.56 | −4.25 | 4.79 | 42.90 | −2.03 | −5.61 | 50.27 | −4.76 | −3.41 |
| 2 | 0.255 | 0 222 | 2.30 | 76.72 | −5.16 | 2.88 | 43.12 | −2.63 | −5.14 | 49.30 | −5.92 | −2.73 |
| 3 | 0.259 | 0.225 | 2.34 | 77.67 | −4.97 | 3.19 | 42.97 | −2.63 | −4.14 | 49.71 | −5.60 | −1.96 |
| 4 | 0.260 | 0.226 | 2.35 | 77.97 | −4.81 | 3.62 | 43.09 | −2.12 | −4.85 | 49.90 | −5.33 | −2.33 |
| 5 | 0.266 | 0.231 | 2.27 | 77.55 | −4.68 | 2.85 | 41.99 | −1.83 | −4.87 | 51.32 | −5.37 | −3.25 |

The values in Tables 2 and 3 were calculated using OPTICS v6.0 and WINDOW v7.3.4.0 software (center of glazing) with NFRC standard default settings. The color parameters L*, a*, b* are values for illuminant. D65, 10° observer.

The invention can be described further in the Miming numbered clauses:

Clause 1: A solar control coating 30, comprising a plurality of phase adjustment layers 40, 50, 62, 86; and a plurality of metal functional layers 46, 58, 70, wherein at least one metal functional layer 46, 58, 70 comprises a metal functional multi-film layer comprising (i) at least one infrared reflective film and (ii) at least one absorptive film.

Clause 2: The solar control coating 30 of clause 1, comprising a first metal functional layer 48 comprising an infrared reflective film; a second metal functional layer 58 comprising an infrared reflective film 57; and a third metal functional layer 70 comprising a metal functional multi-film layer comprising (i) at least one infrared reflective film 73 and (ii) at least one absorptive film 71 comprising copper.

Clause 3: The solar control coating 30 of clause 2, wherein the first metal functional layer 46 comprises a continuous metallic film, preferably silver.

Clause 4: The solar control coating 30 of clauses 2 or 3, wherein the infrared reflective film 57 of the second metal functional layer 58 comprises a continuous metallic film, preferably silver.

Clause 5: The solar control coating 30 of any of clauses 2 to 4, wherein the second metal functional layer 58 comprises a metal functional multi-film layer comprising (i) the infrared reflective film 57 and (ii) at least one absorptive film 59, preferably comprising an alloy of nickel and chromium.

Clause 6: The solar control coating 30 of clause 6, wherein the absorptive film 59 of the second metal functional layer 58 is located over the infrared reflective film 57 of the second metal functional layer 58.

Clause 7: The solar control coating 30 of any of clauses 2 to 6, wherein the at least one infrared reflective film 73 of the third metal functional layer 70 comprises a continuous metallic film, preferably silver.

Clause 8: The solar control coating 30 of any of clauses 2 to 7, wherein the at least one infrared reflective film 73 of the third metal functional layer 70 is located over the at least one absorptive film 71 of the third metal functional layer 70.

Clause 9: The solar control coating 30 of any of clauses 2 to 8, comprising a first phase adjustment layer 40 having an optical thickness in the range of 40 nm to 100 nm, wherein the first metal functional layer 46 is located over the first phase adjustment layer 40; second phase adjustment layer 50 having an optical thickness in the range of 80 nm to 200 nm, wherein the second metal functional layer 58 is located over the second phase adjustment layer 50; a third phase adjustment layer 62 having an optical thickness in the range of 80 nm to 200 nm, wherein the third metal functional layer 70 located over the third phase adjustment layer 62; a fourth phase adjustment layer 86 having an optical thickness in the range of 30 nm to 100 nm located over the third metal functional layer 70; and a protective layer 92 having optical thickness in the range of 1 nm to 30 nm located over the fourth phase adjustment layer 86.

Clause 10: The solar control coating 30 of clause 1, comprising a first phase adjustment layer 40 having an optical thickness in the range of 40 nm to 100 nm, preferably an optical thickness in the range of 50 nm to 90 nm, more preferably an optical thickness in the range of 70 nm to 80 nm; a first metal functional layer 46 located over the first phase adjustment layer 40, wherein the first metal functional layer 46 comprises a continuous metallic film, preferably silver; a first primer layer 48 located over the first metal functional layer 48; a second phase adjustment layer 50 located over the optional first primer layer 48, wherein the second phase adjustment layer 50 has an optical thickness in the range of 80 nm to 200 nm, preferably an optical thickness in the range of 100 nm to 160 nm, more preferably an optical thickness in the range of 130 nm to 140 nm; a second metal functional layer 58 located over the second phase adjustment layer 50, wherein the second metal functional layer 58 comprises a metal functional multi-film layer comprising (i) an infrared reflective film 57 and (ii) at least one absorptive film 59, preferably comprising an alloy of nickel and chromium; a second primer layer 60 located over the second metal functional layer 58; a third phase adjustment layer 62 located over the optional second primer layer 60, wherein the third phase adjustment layer 62 has an optical thickness in the range of 90 nm to 200 nm, preferably an optical thickness in the range of 120 nm to 180 nm, more preferably an optical thickness in the range of 150 nm to 170 nm; a third metal functional layer 70 located over the third phase adjustment layer 62, wherein the third metal functional layer 70 comprises a metal functional multi-film layer comprising (i) at least one infrared reflective film 73 and (ii) at least one absorptive film 71 comprising copper; a third primer layer 72 located over the third metal functional layer 70; a fourth phase adjustment layer 86 located over the optional third primer layer 72, wherein the fourth phase adjustment layer 86 has an optical thickness in the range of 30 nm to 100 nm, preferably an optical thickness in the range of 40 nm to 80 nm, more preferably an optical thickness in the range of 50 nm to 70 nm; and a protective layer 92 located over the fourth phase adjustment layer 86, wherein the protective layer 92 has an optical thickness in the range of 1 nm to 30 nm, preferably an optical thickness in the range of 2 nm to 20 nm, more preferably an optical thickness in the range of 4 nm to 14 nm.

Clause 11: The solar control coating 30 of clause 1, comprising a first phase adjustment layer 40; a first metal functional layer 46 located over the first phase adjustment layer 40; optionally, a first primer layer 48 located over the first metal functional layer 46; a second phase adjustment layer 50 located over the optional first primer layer 48; a second metal functional layer 58 located over the second phase adjustment layer 50; optionally, a second primer layer 60 located over the second metal functional layer 58; a third phase adjustment layer 62 located over the optional second primer layer 60; a third metal functional layer 70 located over the third phase adjustment layer 62; optionally, a third primer layer 72 located over the third metal functional layer 70; a fourth phase adjustment layer 86 located over the optional third primer layer 72; and optionally, a protective layer 92 located over the fourth phase adjustment layer 86, wherein at least one of the metal functional layers 46, 58, 70 comprises a metal functional multi-film layer comprising (i) at least one infrared reflective film and (ii) at least one absorptive film.

Clause 12: The solar control coating 30 of clause 11, wherein the phase adjustment layers 40, 50, 62, 86 comprise dielectric or semiconductor materials.

Clause 13: The solar control coating 30 of clauses 11 or 12, wherein the phase adjustment layers 40, 50, 62, 86 comprise oxides, nitrides, oxynitrides, borides, carbides, oxycarbides, borocarbides, boronitrides, carbonitrides, end/or mixtures, combinations, blends, or alloys thereof.

Clause 14: The solar control coating 30 of any of clauses 11 to 13, wherein the phase adjustment layers 40, 50, 62, 86 comprise oxides, nitrides, or oxynitrides of titanium, hafnium, zirconium, niobium, zinc, bismuth, lead, indium, tin, silicon, aluminum, boron, and mixtures, combinations, blends, or alloys thereof.

Clause 15: The solar control coating 30 of any of clauses 11 to 14, wherein the first phase adjustment layer 40 comprises oxides of zinc and/or tin.

Clause 16: The solar control coating 30 of any of claims 11 to 15, wherein the first phase adjustment layer 40 has an optical thickness in the range of 40 nm to 100 nm, preferably an optical thickness in the range of 50 nm to 90 nm, more preferably an optical thickness in the range of 70 nm to 80 nm.

Clause 17: The solar control coating 30 of any of clauses 11 to 16, wherein the first phase adjustment layer 40 has a geometric thickness in the range of 20 nm to 50 nm, preferably a geometric thickness in the range of 25 nm to 45 nm, more preferably a geometric thickness in the range of 35 nm to 40 nm.

Clause 18: The solar control coating 30 of any of clauses 11 to 17, wherein the first phase adjustment layer 40 comprises a first film 42 and a second film 44.

Clause 19: The solar control coating 30 of clause 18, wherein the first film 42 comprises an oxide of a metal alloy, preferably zinc stannate.

Clause 20: The solar control coating 30 of clauses 18 or 19, wherein the second film 44 comprises a metal oxide or a doped metal oxide, preferably a doped zinc oxide, more preferably tin doped zinc oxide.

Clause 21: The solar control coating 30 of any of clauses 18 to 20, wherein the first film 42 has an optical thickness in the range of 30 nm to 70 nm, preferably an optical thickness in the range of 40 nm to 50 nm, more preferably an optical thickness in the range of 44 nm to 54 nm.

Clause 22: The solar control coating 30 of any of clauses 18 to 21, wherein the first film 42 has a geometric thickness in the range of 15 nm to 35 nm, preferably a geometric thickness in the range of 20 nm to 30 nm, more preferably a geometric thickness in the range of 22 nm to 27 nm.

Clause 23: The solar control coating 30 of any of claims 18 to 22, wherein the second film 44 has an optical thickness in the range of 10 nm to 40 nm, preferably an optical thickness in the range of 16 nm to 38 nm, more preferably an optical thickness in the range of 20 nm to 30 nm.

Clause 24: The solar control coating 30 of any of clauses 18 to 23, wherein the second film 44 has a geometric thickness in the range of 5 nm to 20 nm, preferably a geometric thickness in the range of 8 nm to 18 nm, more preferably a geometric thickness in the range of 10 nm to 15 nm.

Clause 25: The solar control coating 30 of any of clauses 11 to 24, wherein the at least one infrared reflective layer 57, 73 comprises a continuous metal film.

Clause 26: The solar control coating 30 of any of clauses 11 to 25, wherein the at least one infrared reflective film 57, 73 comprises at least one of sever, gold, platinum, palladium, osmium, iridium, rhodium, ruthenium, copper, mercury, rhenium, aluminum, and mixtures, combinations, blends, or alloys thereof, preferably silver.

Clause 27: The solar control coating 30 of any of clauses 11 to 26, wherein the at least one absorptive film 59, 71 comprises at least one of gold, silver, copper, nickel, palladium, platinum, tungsten, rhodium, iridium, tantalum, iron, tin, aluminum, lead, zinc, chromium, molybdenum, niobium, cobalt, manganese, titanium, silicon, chromium, and mixtures, combinations, blends, or alloys thereof.

Clause 28: The solar control coating 30 of any of clauses 11 to 27, wherein the first metal functional layer 46 comprises a single film having a geometric thickness in the range of 5 nm to 25 nm, preferably a geometric thickness in the range of 7 nm to 20 nm, more preferably a geometric thickness in the range of 10 nm to 15 nm.

Clause 20: The solar control coating 30 of any of clauses 11 to 28, wherein the optional primer layers 48, 60, 72 comprise a material selected from the group consisting of titanium, niobium, tungsten, nickel, chromium, iron, tantalum, zirconium, aluminum, silicon, indium, tin, zinc, molybdenum, hafnium, bismuth, vanadium, manganese, and mixtures, combinations, blends, or alloys thereof, preferably titanium.

Clause 30: The solar control coating 30 of any of clauses 11 to 29, wherein the optional first primer layer 48 has a geometric thickness or effective thickness in the range of 0.5 nm to 10 nm, preferably in the range of 1 nm to 5 nm, more preferably in the range of 1.5 nm to 2.5 nm.

Clause 31: The solar control coating 30 of any of clauses 11 to 30, wherein the second phase adjustment layer 50 has an optical thickness in the range of 80 nm to 200 nm, preferably an optical thickness in the range of 100 nm to 160 nm, more preferably an optical thickness in the range of 130 nm to 140 nm.

Clause 32: The solar control coating 30 of any of clauses 11 to 31, wherein the second phase adjustment layer 50 has a geometric thickness in the range of 40 nm to 100 nm, preferably a geometric thickness in the range of 50 nm to 80 nm, more preferably a geometric thickness in the range of 65 nm to 70 nm.

Clause 33: The solar control coating 30 of any of clauses 11 to 32, wherein the second phase adjustment layer 50 comprises a first film 52, a second film 54, and a third film 56.

Clause 34: The solar control coating 30 of clause 33, wherein the first film 52 and/or the third film 56 comprises a metal oxide or a doped metal oxide, preferably zinc oxide or doped zinc oxide, more preferably tin doped zinc oxide.

Clause 35: The solar control coating 30 of clauses 33 or 34, wherein the second film 54 comprises an oxide of a metal alloy, preferably zinc stannate.

Clause 36: The solar control coating 30 of any of clauses 33 to 35, wherein the first film 52 and/or the third film 56 has an optical thickness in the range of 10 nm to 40 nm, preferably an optical thickness in the range of 16 nm to 38 nm, more preferably an optical thickness in the range of 20 nm to 35 nm.

Clause 37: The solar control coating 30 of any of clauses 33 to 36, wherein the first film 52 and/or third film 56 has a geometric thickness in the range of 5 nm to 20 nm, preferably a geometric thickness in the range of 8 nm to 18 nm, more preferably a geometric thickness in the range of 10 nm to 16 nm.

Clause 38: The solar control coating 30 of any of clauses 33 to 37, wherein the second film 54 has an optical thickness in the range of 50 nm to 100 nm, preferably an optical thickness in the range of 70 nm to 90 nm, more preferably an optical thickness in the range of 76 nm to 80 nm.

Clause 39: The solar control coating 30 of any of clauses 33 to 38, wherein the second film 54 has a geometric thickness in the range of 25 nm to 50 nm, preferably a geometric thickness in the range of 35 nm to 45 nm, more preferably a geometric thickness in the range of 38 nm to 42 nm.

Clause 40: The solar control coating 30 of any of clauses 11 to 39, wherein the second metal functional layer 58 comprises a metal functional multi-film layer comprising an infrared reflective film 57, preferably silver, and an absorptive film 59.

Clause 41: The solar control coating 30 of clause 40, wherein the infrared reflective film 57 has a geometric thickness in the range of 5 nm to 25 nm, preferably a geometric thickness in the range of 7 nm to 20 nm, more preferably a geometric thickness in the range of 10 nm to 18 nm.

Clause 42: The solar control coating 30 of clauses 40 or 41, wherein the absorptive film 59 comprises an alloy comprising nickel, chromium, or both nickel and chromium.

Clause 43: The solar control coating 30 of any of clauses 40 to 42, wherein the absorptive film 59 has a geometric thickness in the range of 0 nm to 2 nm, preferably a geometric thickness in the range of 0.1 nm to 1.5 nm, more preferably a geometric thickness in the range of 0.25 nm to 1 nm.

Clause 44: The solar control coating 30 of any of clauses 11 to 43, wherein the optional second primer layer 60 has a geometric thickness or effective thickness in the range of 0.5 nm to 10 nm, preferably a geometric thickness in the range of 1 nm to 5 nm, more preferably a geometric thickness in the range of 1.5 nm to 2.5 nm.

Clause 45: The solar control coating 30 of any of clauses 11 to 44, wherein the third phase adjustment layer 62 has an optical thickness in the range of 90 nm to 200 nm, preferably an optical thickness in the range of 120 nm to 180 nm, more preferably an optical thickness in the range of 150 nm to 170 nm.

Clause 46: The solar control coating 30 of any of clauses 11 to 45, wherein the third phase adjustment layer 62 has a geometric thickness in the range of 45 nm to 100 nm, preferably a geometric thickness in the range of 60 nm to 90 nm, more preferably a geometric thickness in the range of 75 nm to 85 nm.

Clause 47: The solar control coating 30 of any of clauses 11 to 46, wherein the third phase adjustment layer 62 comprises a first film 64, a second film 66, and a third film 68.

Clause 48: The solar control coating 30 of clause 47, wherein the first film 64 and/or the third film 68 comprise a metal oxide or a doped metal oxide, preferably zinc oxide or doped zinc oxide, more preferably tin doped zinc oxide.

Clause 49: The solar control coating 30 of clauses 47 or 48, wherein the second film 66 comprises an oxide of a metal alloy, preferably zinc stannate.

Clause 50: The solar control coating 30 of any of clauses 47 to 49, wherein the first film 64 and/or third film 68 has an optical thickness in the range of 10 nm to 40 nm, preferably an optical thickness in the range of 16 nm to 38 nm, more preferably an optical thickness in the range of 20 nm to 30 nm.

Clause 51: The solar control coating 30 of any of clauses 47 to 50, wherein the first film 64 and/or third film 68 has a geometric thickness in the range of 5 nm to 20 ram, preferably a geometric thickness in the range of 8 nm to 18 nm, more preferably a geometric thickness in the range of 10 nm to 15 nm.

Clause 50: The solar control coating 30 of any of clauses 47 to 49, wherein the second film 66 has an optical thickness in the range of 70 nm to 140 nm, preferably an optical thickness in the range of 80 nm to 120 nm, more preferably an optical thickness in the range of 90 nm to 110 nm.

Clause 51: The solar control coating 30 of any of clauses 47 to 50, wherein the second film 66 has a geometric thickness in the range of 35 nm to 70 nm, preferably a geometric thickness in the range of 40 nm to 60 nm, more preferably a geometric thickness in the range of 45 nm to 55 nm.

Clause 52: The solar control coating 30 of any of clauses 11 to 51, wherein the third metal functional layer 70 comprises an absorptive film 71 and an infrared reflective film 73.

Clause 53: The solar control coating 30 of clause 52, wherein the infrared reflective film 73 comprises a metallic silver film.

Clause 54: The solar control coating 30 of clauses 52 or 53, wherein the infrared reflective film 73 has a geometric thickness in the range of 5 nm to 30 nm, preferably a geometric thickness in the range of 10 nm to 25 nm, more preferably a geometric thickness in the range of 15 nm to 20 nm.

Clause 55: The solar control coating 30 of any of clauses 52 to 54, wherein the absorptive film 71 comprises a metallic material, preferably copper.

Clause 56: The solar control coating 30 of any of clauses 52 to 55, wherein the absorptive film 71 has a physical or effective thickness in the range of 1 nm to 10 nm, preferably in the range of 2.5 nm to 4.5 nm, more preferably in the range of 3 nm to 4 nm.

Clause 57: The solar control coating 30 of any of clauses 11 to 56, wherein the optional third primer layer 72 has a geometric thickness or effective thickness in the range of 0.5 nm to 10 nm, preferably in the range of 1 nm to 5 nm, more preferably in the range of 1.5 nm to 2.5 nm.

Clause 58: The solar control coating 30 of any of clauses 11 to 57, wherein the fourth phase adjustment layer 86 has an optical thickness in the range of 30 nm to 100 nm, preferably an optical thickness in the range of 40 nm to 80 nm, more preferably an optical thickness in the range of 50 nm to 70 nm.

Clause 59: The solar control coating 30 of any of clauses 11 to 58, wherein the fourth phase adjustment layer 86 has a geometric thickness in the range of 15 nm to 50 nm, preferably a geometric thickness in the range of 20 nm to 40 nm, more preferably a geometric thickness in the range of 25 nm to 36 nm.

Clause 60: The solar control coating 30 of any of clauses 11 to 59, wherein the fourth phase adjustment layer 86 comprises a first film 88 and a second film 90.

Clause 61: The solar control coating 30 of clause 60, wherein the first film 88 comprises a metal oxide or doped metal oxide, preferably zinc oxide or doped zinc oxide, more preferably tin doped zinc oxide.

Clause 62: The solar control coating 30 of clauses 60 or 61, wherein the second film 90 comprises an oxide of a metal alloy, preferably zinc stannate.

Clause 63: The solar control coating 30 of any of clauses 60 to 62, wherein the first film 88 has an optical thickness in the range of 4 nm to 40 nm, preferably an optical thickness in the range of 10 nm to 30 nm, more preferably an optical thickness in the range of 14 nm to 22 nm.

Clause 64: The solar control coating 30 of any of clauses 60 to 63, wherein the first film 88 has a geometric thickness in the range of 2 nm to 20 nm, preferably a geometric thickness in the range of 5 nm to 15 nm, more preferably a geometric thickness in the range of 7 nm to 11 nm.

Clause 65: The solar control coating 30 of any of clauses 60 to 64, wherein the second film 90 has an optical thickness in the range of 10 nm to 80 nm, preferably an optical thickness in the range of 20 nm to 60 nm, more preferably an optical thickness in the range of 30 nm to 50 nm.

Clause 68: The solar control coating 30 of any of clauses 60 to 65, wherein the second film 90 has a geometric thickness in the range of 5 nm to 40 nm, preferably a geometric thickness in the range of 10 nm to 30 nm, more preferably a geometric thickness in the range of 15 nm to 25 nm.

Clause 67: The solar control coating 30 of any of clauses 11 to 66, wherein the optional protective layer 92 comprises an oxide of titanium, for example titanium dioxide.

Clause 68: The solar control coating 30 of any of clauses 11 to 67, wherein the protective layer 92 has an optical thickness in the range of 1 nm to 30 nm, preferably an optical thickness in the range of 2 nm to 20 nm, more preferably an optical thickness in the range of 4 nm to 14 nm.

Clause 69: The solar control coating 30 of any of clauses 11 to 68, wherein the protective layer 92 has a geometric thickness in the range of 0.5 nm to 15 nm, preferably a geometric thickness in the range of 1 nm to 10 nm, more preferably a geometric thickness in the range of 2 nm to 7 nm.

Clause 70. The solar control coating 30 of any of clauses 1 to 69, wherein the solar control coating 30 provides a 3 mm reference IGU SHGC of not greater than 0.3, preferably not greater than 0.27, more preferably not greater than 0.25.

Clause 71: The solar control coating 30 of any of clauses 1 to 70, wherein the solar control coating 30 provides a 3 mm reference IGU SHGC in the range of 0.21 to 0.25, preferably in the range of 0.22 to 0.235.

Clause 72: The solar control coating 30 of any of clauses 1 to 71, wherein the solar control coating 30 provides a 3 mm reference IGU visible light transmittance in the range of 40% to 65%, preferably in the range of 50% to 55%, more preferably in the range of 51% to 54.5%.

Clause 73: The solar control coating 30 of any of clauses 1 to 72, wherein the solar control coating 30 provides a 3 mm reference IGU visible light exterior reflectance in the range of 10% to 15%, preferably in the range of 12% to 13.5%.

Clause 74: The solar control coating 30 of any of clauses 1 to 73, wherein the solar control coating 30 provides a 3 mm reference IGLI visible light interior reflectance in the range of 16% to 22%, preferably in the range of 18% to 20%.

Clause 75: The solar control coating 30 of any of clauses 1 to 74, wherein the solar control coating 30 provides a 3 mm reference IGU LSG ratio in the range of 1.6 to 2.5, preferably in the range of 2.1 to 2.4, more preferably in the range of 2.2 to 2.37.

Clause 76; The solar control coating 30 of any of clauses 1 to 75, wherein the solar control coating 30 provides a 3 mm reference IGU transmitted L* in the range of 74 to 80, preferably in the range of 75 to 79, more preferably in the range of 76.5 to 78.5.

Clause 77: The solar control coating 30 of any of clauses 1 to 76, wherein the solar control coating 30 provides a 3 mm reference IGU transmitted a* in the range of −6 to 3, preferably in the range of −5.5 to −4, more preferably in the range of −5.2 to −4.25.

Clause 78: The solar control coating 30 of any of clauses 1 to 77, wherein the solar control coating 30 provides a 3 mm reference IGU transmitted b* in the range of 0 to 6, preferably in the range of 1 to 5, more preferably in the range of 2.8 to 4.8.

Clause 79: The solar control coating 30 of any of clauses 1 to 78, wherein the solar control coating 30 provides a 3 mm reference IGU exterior reflected L* in the range of 30 to 50, preferably in the range of 35 to 49, more preferably in the range of 41.9 to 43.2.

Clause 80: The solar control coating 30 of any of clauses 9 to 79, wherein the solar control coating 30 provides a 3 mm reference IGU exterior reflected a* in the range of −4 to 0, preferably in the range of −3 to −1, more preferably in the range of −2.7 to −1.8.

Clause 81: The solar control coating 30 of any of clauses 1 to 80, wherein the solar control coating 30 provides a 3 mm reference IGU exterior reflected b* in the range of −7 to 0, preferably in the range of −6 to −1, more preferably in the range of −5.8 to −4.1.

Clause 82: The solar control coating 30 of any of clauses 1 to 81, wherein the solar control coating 30 provides a 3 mm reference IGU interior reflected L* in the range of 35 to 55, preferably in the range of 40 to 52, more preferably in the range of 48 to 52.

Clause 83: The solar control coating 30 of any of clauses 1 to 82, wherein the solar control coating 30 provides a 3 mm reference IGU interior reflected a* in the range of −8 to 0, preferably in the range of −6.2 to −1, more preferably in the range of −5.9 to −4.5.

Clause 84: The solar control coating 30 of any of clauses 1 to 83, wherein the solar control coating 30 provides a 3 mm reference IGU interior reflected b* in the range of 5 to 0, preferably in the range of −4 to −1, more preferably in the range of −3.5 to −2.

Clause 85: The solar control coating 30 of any of clauses 1 to 84, wherein the solar control coating 30 provides a sheet resistance of less than 10 ohms per square ($\Omega/\square$), preferably less than $2\Omega/\square$, more preferably less than $1\Omega/\square$.

Clause 86: The solar control coating 30 of any of clauses 1 to 85, wherein the solar control coating 30 has an emissivity in the range of 0.02 to 0.04, preferably in the range of 0.023 to 0.037.

Clause 87: The solar control coating 30 of any of clauses 1 to 86, wherein the solar control coating 30 provides a 3 mm reference IGU Winter id factor in the range of 0.9 to 3 Watt per square meter Kelvin (W/m2-K), preferably in the range of 1 to 2.5 W/m2-k, more preferably in the range of 1.5 to 1.7 W/m2-K.

Clause 88: The solar control coating 30 of any of clauses 1 to 87, wherein the solar control coating 30 provides a 3 mm reference IGU Summer U factor in the range of 1.4 to 1.6 W/m2-K, preferably in the range of 1.52 to 1.57 W/m2-K.

Clause 89: An insulating glass unit (IGU) 100 comprising the solar control coating 30 of any of clauses 1 to 88.

Clause 90: A laminated unit 130 comprising the solar control coating 30 of any of clauses 1 to 88.

Clause 91: A coated article 10, comprising a substrate and the solar control coating 30 of any of clauses 1 to 85.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A solar control coating, comprising:
   a first phase adjustment layer;
   a first metal functional layer located over the first phase adjustment layer;
   a first primer layer over the first metal functional layer;

a second phase adjustment layer located over the first metal functional layer;
a second metal functional layer located over the second phase adjustment layer;
a second primer layer over the second metal functional layer;
a third phase adjustment layer located over the second metal functional layer;
a third metal functional layer located over the third phase adjustment layer;
a third primer layer over the third metal functional layer; and
a fourth phase adjustment layer located over the third metal functional layer,
wherein the second metal functional layer comprises an infrared reflective continuous metallic film and at least one absorptive film comprising an alloy of nickel and chromium, and
wherein the third metal functional layer comprises at least one absorptive film comprising copper over the third phase adjustment layer and at least one infrared reflective film comprising silver over the at least one absorptive film.

2. The solar control coating of claim 1, wherein:
the first phase adjustment layer comprises a first film comprising zinc stannate and a second film comprising zinc oxide located over the first film;
the second phase adjustment layer comprises a first film comprising zinc oxide, a second film comprising zinc stannate located over the first film, and a third film comprising zinc oxide located over the second film;
the third phase adjustment layer comprises a first film comprising zinc oxide, a second film comprising zinc stannate located over the first film, and a third film comprising zinc oxide located over the second film; and
the fourth phase adjustment layer comprises a first film comprising zinc oxide and a second film comprising zinc stannate located over the first film.

3. The solar control coating of claim 1, wherein the infrared reflective continuous metallic film of the second metal functional layer comprises silver, and wherein the at least one absorptive film comprising an alloy of nickel and chromium is located over the infrared reflective continuous metallic film.

4. The solar control coating of claim 1, wherein the first metal functional layer comprises an infrared reflective film.

5. The solar control coating of claim 4, wherein the infrared reflective film of the first metal functional layer comprises silver.

6. The solar control coating of claim 1, wherein the infrared reflective continuous metallic film of the second metal functional layer comprises silver.

7. The solar control coating of claim 1, wherein the at least one infrared reflective film of the third metal functional layer comprises silver.

8. The solar control coating of claim 1, wherein the first phase adjustment layer has an optical thickness in the range of 40 nm to 100 nm;
the second phase adjustment layer has an optical thickness in the range of 80 nm to 200 nm;
the third phase adjustment layer has an optical thickness in the range of 90 nm to 200 nm;
the fourth phase adjustment layer has an optical thickness in the range of 30 nm to 100 nm; and
the solar control coating further comprises a protective layer having optical thickness in the range of 1 nm to 30 nm located over the fourth phase adjustment layer.

9. The solar control coating of claim 7, wherein the first metal functional layer comprises silver.

10. The solar control coating of claim 1, wherein the solar control coating provides a 3 mm reference insulating glass unit (IGU) solar heat gain coefficient (SHGC) of not greater than 0.3.

11. The solar control coating of claim 1, wherein the solar control coating provides a 3 mm reference insulating glass unit (IGU) light to solar gain (LSG) ratio greater than 1.85.

12. The solar control coating of claim 1, wherein the at least one absorptive film comprising copper has an effective thickness of greater than 2.5 nm.

13. The solar control coating of claim 1, wherein the solar control coating is a non-heat-treated solar coating.

14. A coated article comprising:
a substrate; and
a solar control coating over at least a portion of the substrate, wherein the solar control coating comprises:
a first phase adjustment layer;
a first metal functional layer located over the first phase adjustment layer;
a first primer layer over the first metal functional layer;
a second phase adjustment layer located over the first metal functional layer;
a second metal functional layer located over the second phase adjustment layer;
a second primer layer over the second metal functional layer;
a third phase adjustment layer located over the second metal functional layer;
a third metal functional layer located over the third phase adjustment layer;
a third primer layer over the third metal functional layer; and
a fourth phase adjustment layer located over the third metal functional layer,
wherein the second metal functional layer comprises an infrared reflective continuous metallic film and at least one absorptive film comprising an alloy of nickel and chromium, and
wherein the third metal functional layer comprises at least one absorptive film comprising copper over the third phase adjustment layer and at least one infrared reflective film comprising silver over the at least one absorptive film.

15. The coated article of claim 14, wherein the first metal functional layer comprises an infrared reflective film.

16. The coated article of claim 15, wherein the infrared reflective film of the first metal functional layer comprises silver.

17. The coated article of claim 14, wherein the first phase adjustment layer has an optical thickness in the range of 40 nm to 100 nm;
the second phase adjustment layer has an optical thickness in the range of 80 nm to 200 nm;
the third phase adjustment layer has an optical thickness in the range of 90 nm to 200 nm;
the fourth phase adjustment layer has an optical thickness in the range of 30 nm to 100 nm located over the third metal functional layer; and
the solar control coating further comprises a protective layer having optical thickness in the range of 1 nm to 30 nm located over the fourth phase adjustment layer.

18. The coated article of claim 17, wherein the first metal functional layer comprises silver.

19. The coated article of claim 14, wherein the at least one infrared reflective film of the third metal functional layer comprises silver.

20. The coated article of claim 14, wherein the infrared reflective continuous metallic film of the second metal functional layer comprises silver, and wherein the at least one absorptive film comprising an alloy of nickel and chromium is located over the infrared reflective continuous metallic film.

\* \* \* \* \*

UNITED STATES PATENT AND TRADEMARK OFFICE
CERTIFICATE OF CORRECTION

Page 1 of 1

PATENT NO. : 10,539,726 B2
APPLICATION NO. : 15/251025
DATED : January 21, 2020
INVENTOR(S) : Andrew V. Wagner et al.

It is certified that error appears in the above-identified patent and that said Letters Patent is hereby corrected as shown below:

On the Title Page

Column 1, after item (72) Inventors: Andrew V. Wagner, Pittsburgh, PA (US); Patrick Fisher, Pittsburgh, PA (US); Paul A. Medwick, Wexford, PA (US) insert -- ;Benjamin Lucci, Pittsburgh, PA (US) --

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*